(12) United States Patent
Krause

(10) Patent No.: US 8,771,574 B2
(45) Date of Patent: Jul. 8, 2014

(54) BONDING OF FIBRE-REINFORCED MATERIAL WITH AN INJECTION-MOULDING MATERIAL; COMPONENT AND APPARATUS FOR CONDUCT OF THE PROCESS

(75) Inventor: Frank Krause, Bergisch Gladbach (DE)

(73) Assignee: Lanxess Deutschland GmbH, Leverkusen (DE)

( * ) Notice: Subject to any disclaimer, the term of this patent is extended or adjusted under 35 U.S.C. 154(b) by 1279 days.

(21) Appl. No.: 12/280,841

(22) PCT Filed: Feb. 19, 2007

(86) PCT No.: PCT/EP2007/001398
§ 371 (c)(1),
(2), (4) Date: Sep. 29, 2008

(87) PCT Pub. No.: WO2007/098869
PCT Pub. Date: Sep. 7, 2007

(65) Prior Publication Data
US 2009/0029122 A1    Jan. 29, 2009

(30) Foreign Application Priority Data
Mar. 2, 2006    (DE) .................. 10 2006 010 271

(51) Int. Cl.
*B29C 70/42*    (2006.01)
*B29C 45/14*    (2006.01)

(52) U.S. Cl.
CPC . *B29C 45/14311* (2013.01); *B29C 2045/14877* (2013.01); *B29C 2045/14286* (2013.01); *B29C 45/1418* (2013.01); *B29C 45/14786* (2013.01)

USPC .......................................... 264/257; 264/266

(58) Field of Classification Search
USPC ................... 264/259, 257, 258, 266
See application file for complete search history.

(56) References Cited

U.S. PATENT DOCUMENTS

| | | | | | |
|---|---|---|---|---|---|
| 4,360,329 A | * | 11/1982 | Hatakeyama | ............. | 425/112 |
| 5,506,029 A | * | 4/1996 | Hara et al. | ................. | 428/120 |
| 5,945,059 A | * | 8/1999 | Atake | ........................ | 264/510 |

FOREIGN PATENT DOCUMENTS

| | | |
|---|---|---|
| DE | 100 29 822 A1 | 12/2001 |
| EP | 0 045 421 A | 2/1982 |
| EP | 0 547 625 A1 | 6/1993 |
| JP | 63 295309 A | 12/1988 |
| JP | 05 269785 A | 10/1993 |

* cited by examiner

*Primary Examiner* — Leo B Tentoni
(74) *Attorney, Agent, or Firm* — Norris McLaughlin & Marcus PA

(57) ABSTRACT

The invention relates to a process for the bonding of a fiber-reinforced material to an injection-molding material. The invention further relates to an article produced according to the process.

It is an object of the invention to improve the bond between a fiber-reinforced starting material and a material applied by injection.

To achieve the object, a fiber-reinforced plastics material is heated locally, and further plastics material is applied by injection. This produces a particularly good coherent bond between the further plastics material and the fiber-reinforced plastics material. Ease of handling is also provided.

The invention relates to a component produced according to the process and also to an apparatus for carrying out the process.

10 Claims, 2 Drawing Sheets

BONDING OF FIBRE-REINFORCED MATERIAL WITH AN INJECTION-MOULDING MATERIAL; COMPONENT AND APPARATUS FOR CONDUCT OF THE PROCESS

This application is a 371 of PCT/EP2007/001398, filed Feb. 19, 2007, which claims foreign priority benefit under 35 U.S.C. §119 of the German Patent Application No. 10 2006 010 271.1 filed Mar. 2, 2006.

The invention relates to a process for the bonding of a fibre-reinforced plastics material to a further plastics material. The invention further relates to a moulding produced according to the process and also to an apparatus for carrying out the process.

BACKGROUND OF THE INVENTION

It is known from the prior art that plastics mouldings can be bonded to one another via welding. The thermoplastics are heated locally to an adequately high temperature, and are joined at the heated sites. The heating takes place in the context of ultrasound jointing, vibration welding or, for example, laser welding. Techniques of this type are used by way of example by the company Branson Ultraschall in Dietzenbach, Germany.

A process known from the prior art begins, if necessary, by subjecting a fibre-reinforced sheet-type starting material to a forming process. As can be found by way of example in the publication by Sonja Pongratz and Hans Laich "Es muss nicht immer Stahl sein" [It does not always have to be steel], in Kunststoffe July 2004, plastics material is applied by injection, in an injection mould, onto the starting material after it has been subjected to the forming process. Fibre-reinforced sheet-type starting material for the purposes of the present invention is commercially available, for example from the company Bond—Laminates GmbH in Brillon in Germany.

The fibres are composed by way of example of glass, carbon or aramid. The material also encompasses thermoplastics or thermosets. Thermoplastics used comprise PA, PBT, TPU, PC or PPS, as published in November 2005 by way of the Internet on the www.bond-laminates.com page. This Internet page also reveals that the starting material can be used for production of mouldings via a forming process and/or attachment of bonding elements and of reinforcing elements via welding or injection moulding.

If plastics material is applied by injection to a sheet-type starting material, the bonds that result between the sheet-type starting material and the plastics material applied by injection are of relatively low mechanical stability.

It is an object of the invention, in an injection-moulding process, to improve the bond between a fibre-reinforced starting material and a material applied thereto.

SUMMARY OF THE INVENTION

To achieve the object, a fibre-reinforced, sheet-type plastics material is used as starting material and encompasses a thermoplastic. Regions of the fibre-reinforced, sheet-type starting material or fibre-reinforced, sheet-type plastics material are heated locally, these being the regions to which further plastics material is intended to be applied by injection. The heating gives a marked improvement in the mechanical quality of the subsequent bond between the plastics material applied by injection and the fibre-reinforced, sheet-type starting material. The fibre-reinforced, sheet-type starting material is especially not heated in its entirety to temperatures which exceed the melting point of the thermoplastic of the fibre-reinforced, sheet-type starting material. Conventional and simple methods can therefore be used to handle the fibre-reinforced, sheet-type starting material and bring it into an injection mould. If the fibre-reinforced, sheet-type starting material had been brought in its entirety to melting point, this would have been attended by major problems of handling.

Melting point is the minimum temperature required to permit injection of the plastic in the injection-moulding process.

DETAILED DESCRIPTION

To achieve the object, therefore, the fibre-reinforced, sheet-type starting material is heated locally at the sites mentioned and specifically and particularly to temperatures which markedly exceed the melting point of the thermoplastic material. The fibre-reinforced, sheet-type starting material can be subjected in advance in a desired manner to a forming process. The location of the sheet-type starting material is ideally in the injection mould by the time that the local heating process is ended, since this can give ideal utilization of the heat supplied. The injection mould is then closed and further plastics material is applied by injection. Finally, the injection mould is again opened, and the resultant component is ejected. The bond between the fibre-reinforced, sheet-type starting material and the further plastic applied by injection has mechanical stability.

The local heating preferably takes place by way of input of infra-red radiation or of laser radiation. This type of radiation can specifically be supplied by way of optical waveguides to the thermoplastic to be heated in the starting material. By using this method of supply, it is possible to supply the intra-red light or laser light to the thermoplastic by way of arms of a robot which introduces the fibre-reinforced, sheet-type starting material into an injection mould. While the robot brings the fibre-reinforced, sheet-type starting material or fibre-reinforced, sheet-type plastics material into an injection mould, therefore, this material is simultaneously heated locally. The local heating process is therefore successful without any need to accept delays. This method also permits energy to be supplied locally for the maximum time to the fibre-reinforced, sheet-type starting material or fibre-reinforced, sheet-type plastics material. This method moreover permits very rapid introduction of heat into the fibre-reinforced, sheet-type starting material, and specifically and particularly within a few seconds, and specifically and in particular within less than five seconds.

In one advantageous embodiment, the fibre-reinforced, sheet-type starting material is heated locally to temperatures which are above the melting point of the thermoplastic by more than 40° C., particularly preferably by more than 60° C. Without the local heating process, it would not be possible to heat the fibre-reinforced, sheet-type starting material to such high temperatures without any risk of problems of handling. Selection of these unusually high temperatures is successful in giving a particularly stable bond between the further plastics material applied by injection and the fibre-reinforced, sheet-type starting material.

In another embodiment, the fibre-reinforced, sheet-type starting material is provided with supplementary warming in its entirety to temperatures which are preferably below the melting point of the thermoplastic material of the fibre-reinforced, sheet-type starting material, prior to application of the further plastics material by injection. A result particularly dependably achieved by this method is that the regions heated locally during the application-by-injection process continue to receive a high level of heating. The resultant bond is thus further improved.

In one embodiment, the application-by-injection process to some extent inserts the further plastics material under pressure into the fibre-reinforced plastics material, i.e. the fibre-reinforced, sheet-type starting material. This produces not only a coherent bond but also interlock bonding between the further plastics material and the fibres of the fibre-reinforced plastics material. This type of bond is substantially stabler than with the bond known from the prior art.

That proportion of the further plastics material which has been applied by injection but not subjected to insertion under pressure forms by way of example a functional element or a reinforcing element, which has thus been attached in an improved manner to the fibre-reinforced plastics material.

In one particularly preferred embodiment, further plastics material is applied by injection to the fibre-reinforced sheet-type starting material on one side in such a way that a portion of the further plastics material is pressed outward at the opposite side. The plastics material applied by injection thus moves between the fibres of the fibre-reinforced, sheet-type starting material. The result is therefore not only adhesive bonding or weld bonding but also interlock bonding between the further plastics material applied by injection and the fibre-reinforced, sheet-type starting material.

In one embodiment of the invention, the interlocking bond achieved between the further plastics material applied by injection and the fibre-reinforced starting material or fibre-reinforced plastics material merely takes the form of points. Bonding in the form of points can be achieved in a technically simple manner.

In order to achieve point bonding via injection moulding, a fibre-reinforced, sheet-type starting material is warmed in its entirety and, in the warmed condition, is subjected to a forming process. The starting material encompasses not only the fibres but also thermoplastic material. The fibres are preferably continuous-filament fibres, so that a particularly stable bond can be successfully obtained. Using arms intended for this purpose, a robot picks up the fibre-reinforced, sheet-type starting material that has been subjected to the forming process. A plurality of optical waveguides run along the arms. Diode lasers feed into one end of the optical waveguides. At the other end, lenses provide appropriate transfer of the laser light input to the thermoplastic. By way of example, the lenses ensure that laser light in linear form impacts the thermoplastic material, if a linear form is desired.

As an alternative, diode-laser units (known as diode stacks) can be used directly on the robot, instead of optical waveguides.

Laser light whose wavelength is preferably from 810 to 1064 nm, particularly preferably up to 980 nm, is thus supplied by way of the optical waveguides to the fibre-reinforced, sheet-type starting material. The wavelength ranges mentioned are advantageous, firstly because they do not heat the plastic merely at the surface, but also heat deeper-lying regions. Secondly, appropriate diode lasers are relatively inexpensive, and this is particularly true for wavelengths up to 890 nm.

The fibre-reinforced, sheet-type starting material is thus heated locally to temperatures which exceed the melting point of the thermoplastic in particular by from 20 to preferably 60° C. The fibre-reinforced, sheet-type starting material 2 which has been subjected to a forming process is brought into an injection mould 1 during the local heating process.

Figure 1:
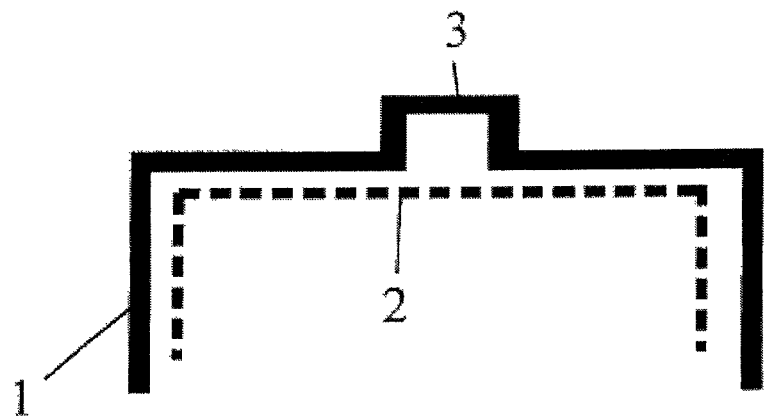
FIG. 1: shows an injection mould with fibre-reinforced plastics material introduced.

The injection mould 1 has depression 3. The location of the depressions 3 is behind the fibre-reinforced plastics material 2 introduced, as is visible in FIG. 1, which shows a section through the injection mould 1 and the fibre-reinforced plastics material 2 introduced.

Figure 2:
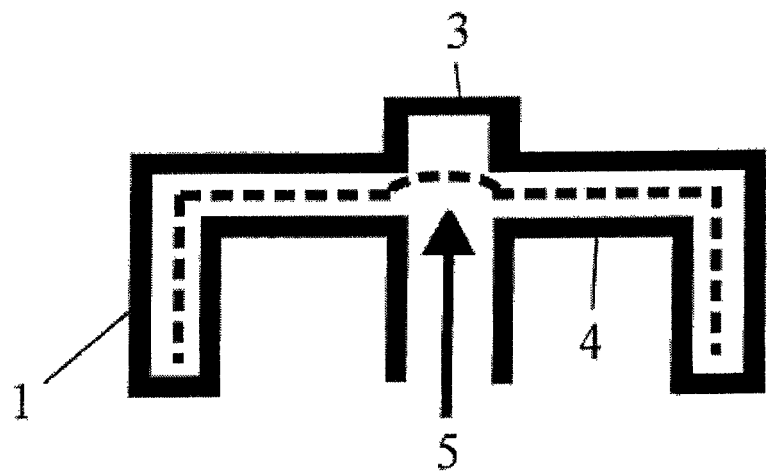
FIG. 2: shows a closed injection mould.

The injection mould 1 is then sealed by a counter-mould 4. Further plastics material is inserted under pressure into the sealed injection mould as can be seen in FIG. 2, for example using a pressure of from 600 to 1000 bar. Injected plastics material 5 then penetrates into the fibres of the fibre-reinforced starting material 2 at the sites whose reverse side has a depression 3 and which have been heated locally in advance. The result goes beyond the prior art in providing interlocking bonding between the fibre-reinforced plastics material and the injected plastics.

The fibres of the fibre-reinforced plastics material 2 here are regularly displaced in the direction of depression 3, as shown diagrammatically in FIG. 2.

Figure 3:
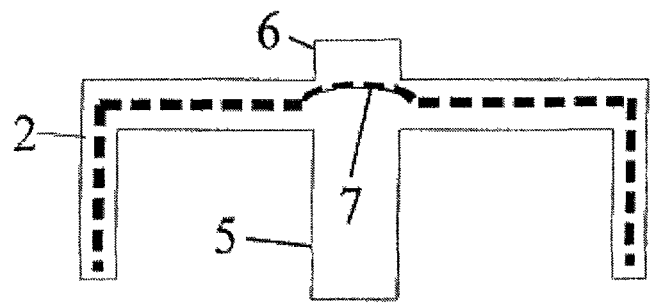
FIG. 3: shows a moulding produced.

FIG. 3 illustrates some typical features of the resultant moulding. The fibre-reinforced plastics material 2 has a fillet 5 applied by injection on one of its sides and, on the opposite side, a nub-shaped protrusion 6, which has been produced by virtue of the depression 3. In this region, the fibres of the fibre-reinforced material 2 have been displaced in the direction of projection 6.

The regions heated locally prior to the application-by-injection process are specifically those at which the fillets adjoin the fibre-reinforced, sheet-type starting material. The result is a particularly stable coherent bond between the thermoplastic of the fibre-reinforced, sheet-type starting material and the fillets or, respectively, ribs applied by injection. Furthermore, the rib structure has additional points of interlock bonding to the fibre-reinforced plastics material 2, at inflection points or at intersections.

An injection mould 1 can have depressions 3 in the form of grooves instead of depression 3 distributed in the form of points. The result then, along a groove 3, is not only a particularly good coherent bond but also supplementary interlock bonding. By way of example, it is thus possible to bond ribs entirely via a coherent bond and interlock bonding to a fibre-reinforced plastics material. Projections 6 running linearly are then produced on the opposite side.

If a projection 6 is undesired, this can finally be removed via milling or grinding. A remaining characteristic feature is the displacement of fibres 7 of the fibrous material.

Alongside robots, conventional injection-moulding techniques and injection-moulding equipment can be used to carry out the process, as long as these can typically withstand pressures of 1000 bar, and robots can easily be retro-fitted with optical waveguides and diode lasers, to permit local supply of heat.

Thermoplastic materials of particularly good suitability for carrying out the invention are PA 66, PA 6, PBT, PP, PET, PA 12, PPS, TPU or PA 46. Preference is therefore given to semicrystalline plastics with low viscosity which are not susceptible to internal stresses. However, some amorphous materials are also suitable, and specifically and particularly PS, ABS and/or PC. The plastics mentioned can also be mixed with one another.

One desired process for the forming of fibre-reinforced plastics material preferably takes place in an injection mould 1 via sealing by a counter-mould 4, thus permitting particularly low-cost production.

In order to achieve particularly stable interlock bonding, the fiber-reinforced material has continuous-filament fibers which have preferably been braided with one another. The fiber-reinforced plastics material then has, for example, fibers in the form of a textile.

Fiber-reinforced plastics materials with particularly good suitability take the form of sheet-like starting material whose wall thickness is from 0.2 to 8 mm. If the starting material is too thick, it is then difficult to impress the plastics material into the fibers. Excessively thin starting material does not have sufficient stability.

The inventive process permits the production of components from a single material. An article produced according to the invention is then therefore composed of only one plastic. This simplifies recycling.

In order to make a further improvement in the total stability of articles produced, in one embodiment of the invention, plastics material mixed with fibers is bonded to the fiber-reinforced plastics material. The further plastics material then uses chopped fibers whose average initial fiber length is preferably from 2 to 15 mm. The average initial fiber length is particularly preferably from 2 to 3 mm, in order to obtain particularly good results. The lengths of the fibers used become shorter by virtue of the further processing, and specifically and regularly by a factor of 10. The average fiber length in the product produced is therefore regularly from a few tens of μm to 2 mm. It is preferably not only the average length that is within the stated range but also all or most of the individual fibers.

The invention is preferably used to produce oil pans, for example for motor vehicles, with external rib structure. The ribs have inter alia interlock bonding to the container. The ribs serve for absorption of energy in the event of stone impact, and also in the event of an accident, in order to prevent damage to the container. They therefore provide particularly dependable protection of the container and are not merely broken away when the oil pan is subject to stone impact during travel. According to the invention, it is then equally possible to attach a fastening collar for the oil pan. There are no corrosion problems, and this is another factor favoring production of an oil pan from plastic.

The bonds produced according to the invention are, and remain, dependably impermeable to liquid and gas. Another preferred application sector is provided by articles in which importance is placed on bonds which are dependably impermeable to liquid and/or gas. An example of one preferred application sector is therefore bulkheads which protect the interior of a car from water penetration.

The mould costs for carrying out the process are relatively low. According to the invention it is therefore preferable to produce articles which are produced with relatively small numbers of units. The overall production of these can be achieved at lower cost when comparison is made with alternative production processes. One preferred application sector is therefore components of trucks and niche-market cars such as cabriolets, in order to replace components hitherto entirely or to some extent produced from metal. For the purposes of the invention, the numbers of units produced of these vehicles are small.

The bond is not damaged by temperature variations. Another preferred application sector is therefore mouldings or articles which have exposure to temperature variations, which the bonds have to resist. The invention can therefore by way of example also be used in mouldings for aircraft.

Another typical field of application for the invention is protective helmets with fastening elements or rib structures. Fastening elements are attached according to the invention. By way of example, the fastening elements serve to fasten a visor on the helmet or Styropor® within the helmet.

Inventive examples started from commercially available, fibre-reinforced sheet-type thermoplastic materials from Bond-Laminates GmbH. The thickness of the sheets was 2 mm. The sheets were rectangular, with length 380 mm and width 128 mm. They had three holes which served for positioning in the injection mould. The plastics material used comprised inter alia PA6. The fibres were composed of glass, carbon, or aramid.

Figure 4:
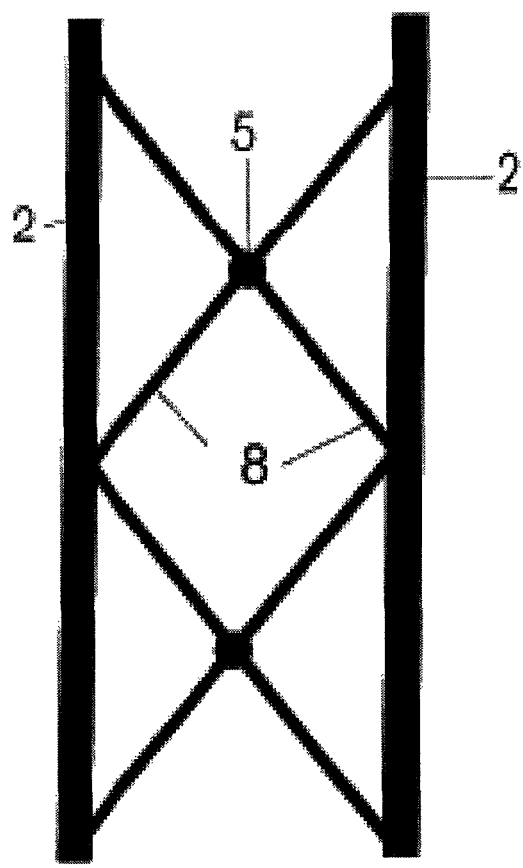
FIG. 4: shows another molding produced, seen from the lower side.

The sheets were preheated for 3 minutes at 300° C. in an oven and subjected to a forming process, and, after they had cooled to some extent, were placed in an injection mould, and heated locally to temperatures of 320° C. during this process. The mould temperature set was 95° Celsius. The shape of the injection mould was such as to permit production of a substrate reinforced with ribs 8. Behind the inserted fibre-reinforced starting material there were, in the injection mould—as can be seen from FIGS. 1 and 2—circular recesses 3 at a distance of 5.5 cm with diameter 9 mm and depth 1 mm. Closure of the injection mould was followed by injection of further glass-fibre-reinforced PA 6 plastics material using an injection rate of 120 mm/s. The injection pressure was initially 900 bar for one second. The post-injection pressure was 600 bar for a further 8 seconds. After a cooling time of 30 seconds, the injection mould was opened and the substrate produced, reinforced with ribs, was ejected. The ribs 8 had also been bonded in the form of points to the fibre-reinforced material via interlock bonding in the manner visible in FIG. 3 and furthermore via a coherent bond. FIG. 3 shows a section of a substrate thus produced. The fillet 5 represents a point of intersection of two intersecting ribs 8. FIG. 4 shows a section of a substrate produced, seen from the lower side. The ribs 8 also have interlock bonding in the form of points by way of the fillets 5 to the fibre-reinforced starting material 2. The result was therefore a substantially stronger bond between the fibre-reinforced starting material 2 and the other plastics material, when comparison is made with the prior art mentioned in the introduction.

The invention claimed is:

1. Process for the bonding of a fiber-reinforced, sheet-type, thermoplastic material to a further plastics material, said process comprising heating regions of the fiber-reinforced, sheet-type, thermoplastic material at which said further plastic material is to be bonded, but not the entirety of the fiber-reinforced, sheet-type, thermoplastic material, to temperatures above the melting point of said thermoplastic material, and injecting said further plastics material into one side said regions heated above the melting point of said thermoplastic material to press outward on the side opposite said one side.

2. Process according to claim 1, wherein, in addition to the regions that are heated to temperatures above the melting point of the thermoplastic material, the remainder of the fiber-reinforced, sheet-type plastics material is heated or warmed.

3. Process according to claim 1, wherein said regions that are heated to temperatures above the melting point of said thermoplastic material are heated via laser radiation or infrared radiation.

4. Process according to claim 1, wherein said heating is performed while said fiber-reinforced, sheet-type, thermoplastic material is being transported by a robot into an injection mold.

5. Process according to claim 1, in which the further plastics material is to some extent inserted under pressure into the fiber-reinforced thermoplastic material.

6. Process according to claim 5, in which the further plastic is inserted under pressure in the form of points or lines into the fiber-reinforced thermoplastic material.

7. Process according to claim 5, wherein, in addition to the regions that are heated to temperatures above the melting point of the thermoplastic material, the remainder of the fiber-reinforced thermoplastic material is heated or warmed prior to the insertion-under-pressure process.

8. Process according to claim 1, in which the fiber-reinforced thermoplastic material is brought into an injection mold which, behind the fiber-reinforced thermoplastic material introduced, has one or more depressions, and from the opposite side further plastics material is inserted under pressure into the fiber-reinforced plastics material.

9. Process according to claim 8, in which, by virtue of the pressure of the further plastics material, the fiber-reinforced thermoplastic material moves into the depressions.

10. Process according to claim 1, in which PA 66, PA 6, PBT, PP, PET, PA 12, PPS, TRJU, PA 46, PS, ABS and/or PC or a mixture thereof is used as plastic.

* * * * *